May 31, 1966 D. A. CRONIN, JR 3,253,593
URINARY DRAINAGE SYSTEM AND PARTS THEREOF
Filed Dec. 3, 1963 8 Sheets-Sheet 1
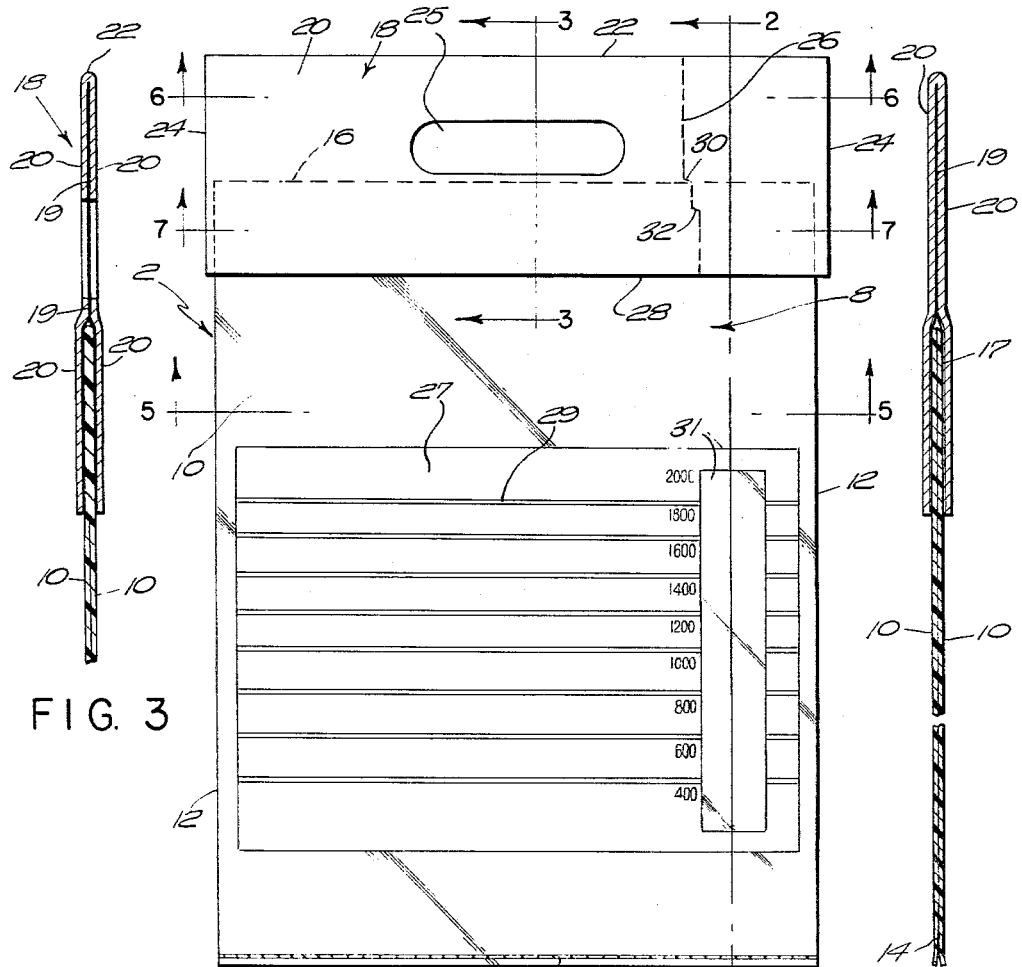
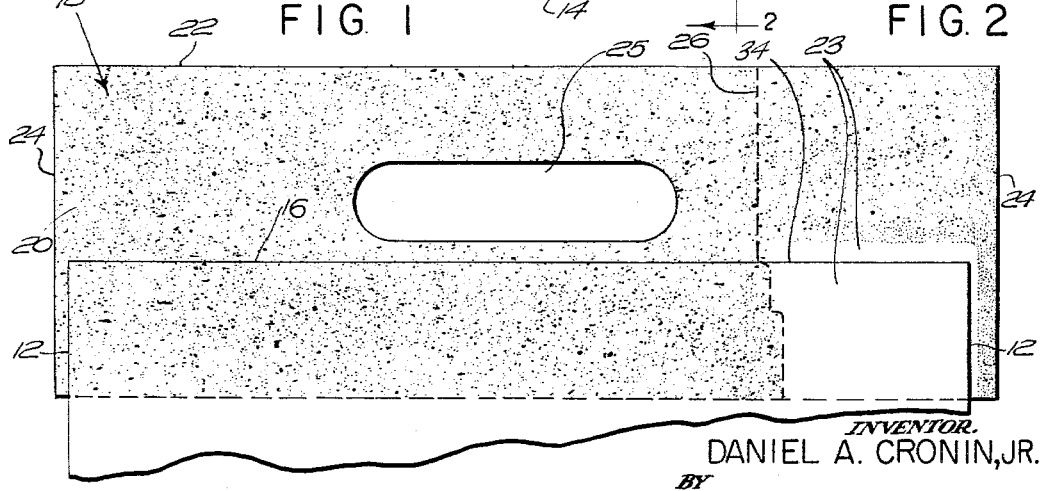
INVENTOR.
DANIEL A. CRONIN, JR.
BY
Dike, Thompson, Bronstein & Mrose
ATTORNEYS May 31, 1966 D. A. CRONIN, JR 3,253,593
URINARY DRAINAGE SYSTEM AND PARTS THEREOF
Filed Dec. 3, 1963 8 Sheets-Sheet 2

INVENTOR.
DANIEL A. CRONIN, JR.
BY
Dike, Thompson, Bronstein & Mrose
ATTORNEYS

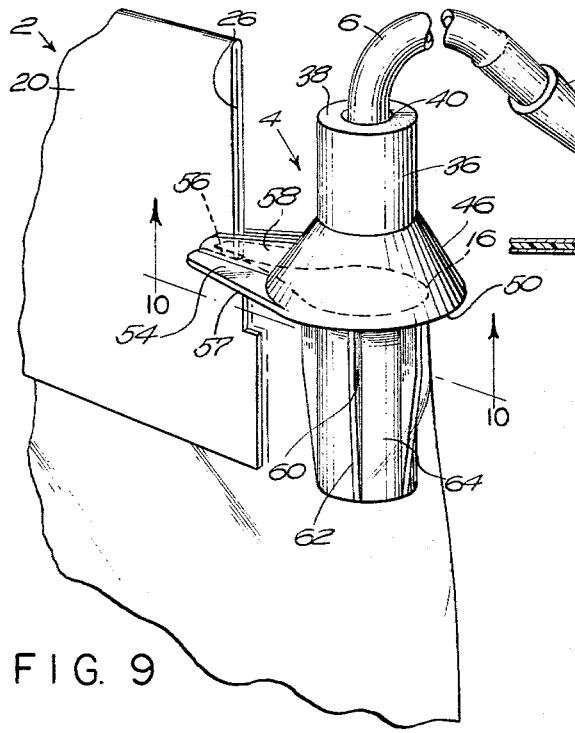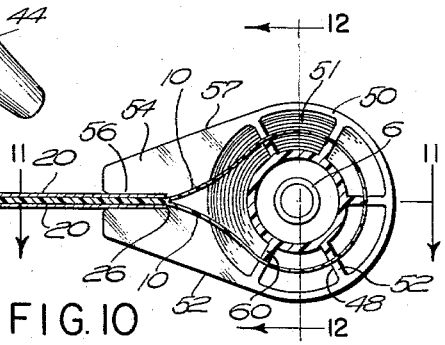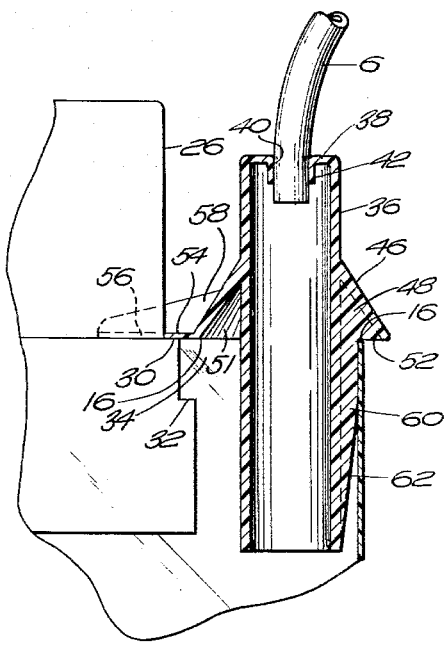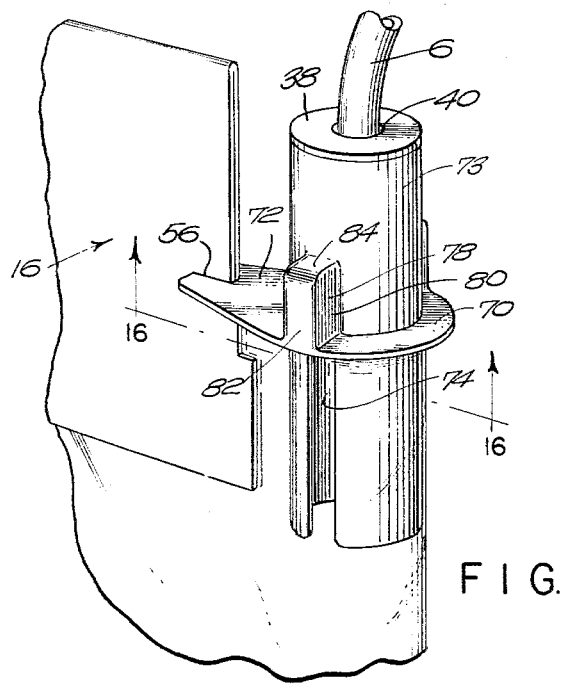

May 31, 1966 D. A. CRONIN, JR 3,253,593
URINARY DRAINAGE SYSTEM AND PARTS THEREOF
Filed Dec. 3, 1963 8 Sheets-Sheet 4

INVENTOR.
DANIEL A. CRONIN, JR.
BY
Dike, Thompson, Bronstein & Mrose
ATTORNEYS

May 31, 1966     D. A. CRONIN, JR     3,253,593
URINARY DRAINAGE SYSTEM AND PARTS THEREOF
Filed Dec. 3, 1963     8 Sheets-Sheet 5

INVENTOR.
DANIEL A. CRONIN, JR
BY
Dike, Thompson, Bronstein & Mrose
ATTORNEYS

May 31, 1966     D. A. CRONIN, JR     3,253,593
URINARY DRAINAGE SYSTEM AND PARTS THEREOF
Filed Dec. 3, 1963     8 Sheets-Sheet 6
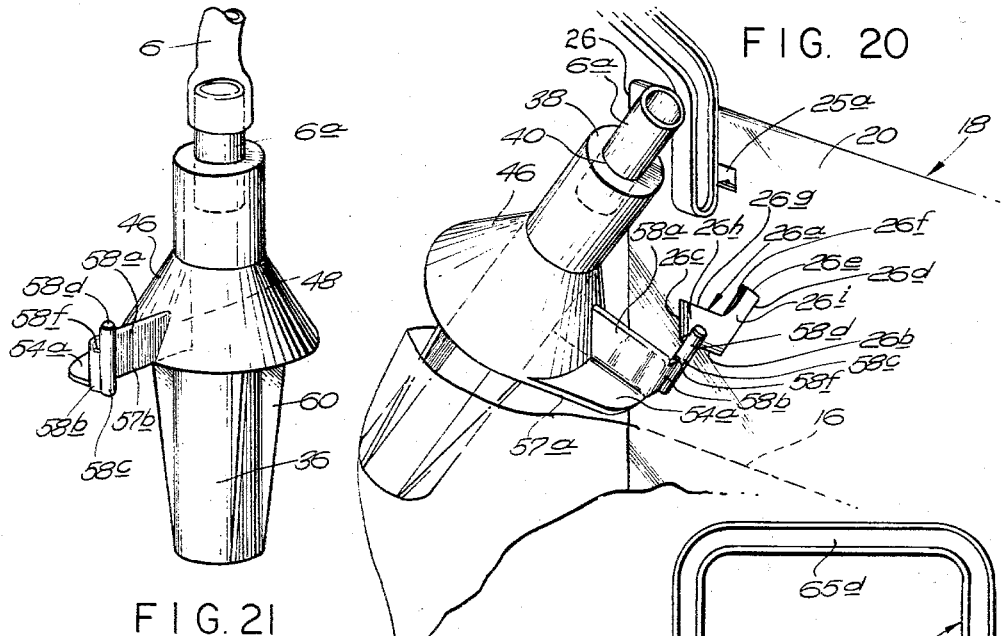
FIG. 20
FIG. 21
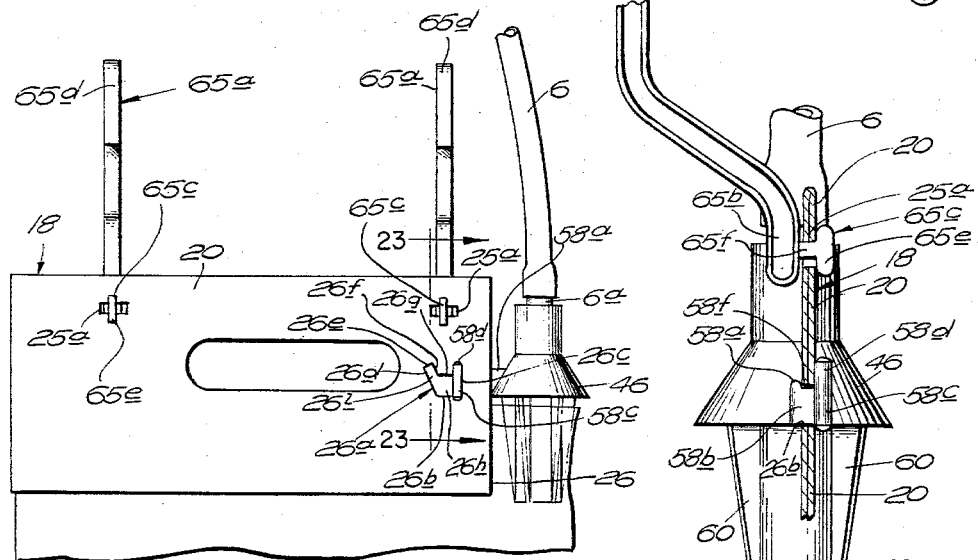
FIG. 22
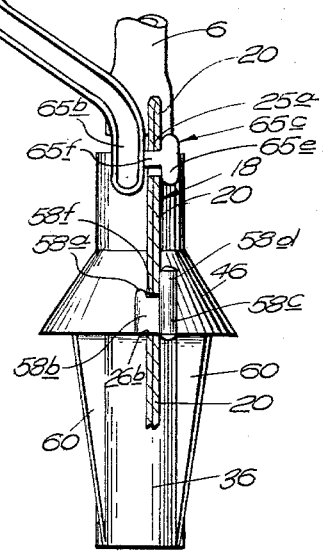
FIG. 23
FIG. 24
INVENTOR.
DANIEL A. CRONIN, JR.
BY 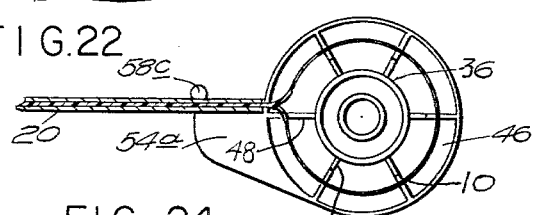
ATTORNEYS

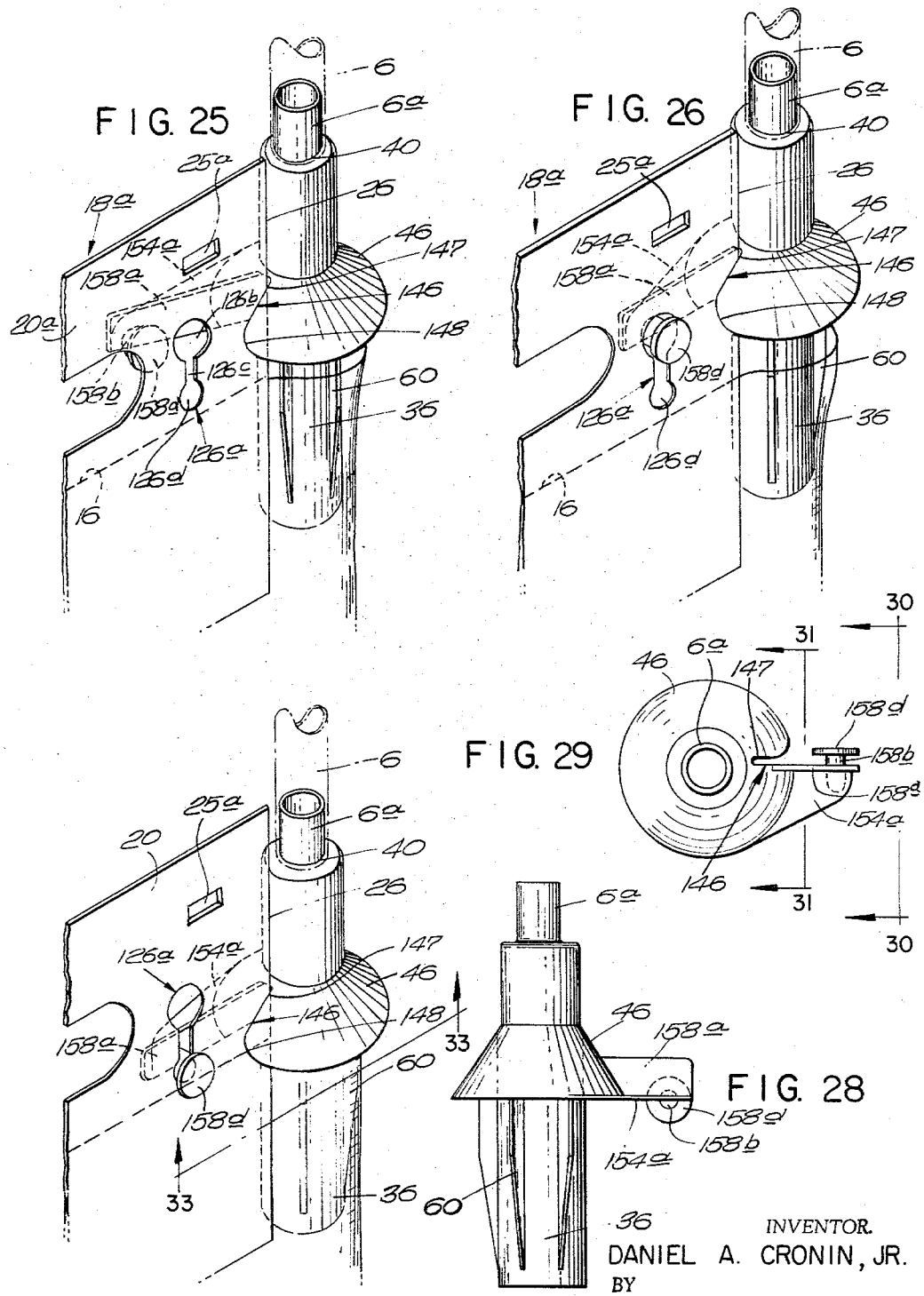

May 31, 1966 D. A. CRONIN, JR 3,253,593
URINARY DRAINAGE SYSTEM AND PARTS THEREOF
Filed Dec. 3, 1963 8 Sheets-Sheet 8

INVENTOR.
DANIEL A. CRONIN, JR.
BY
*Dike, Thompson, Bronstein & Mrose*
ATTORNEYS

United States Patent Office 3,253,593
Patented May 31, 1966

3,253,593
URINARY DRAINAGE SYSTEM AND PARTS
THEREOF
Daniel A. Cronin, Jr., Concord, Mass., assignor to The
Macbick Company, Cambridge, Mass., a corporation of
Massachusetts
Filed Dec. 3, 1963, Ser. No. 328,789
28 Claims. (Cl. 128—275)

This application is a continuation-in-part of my application Serial No. 190,156, filed April 25, 1962 now abandoned.

The present invention relates to a novel and unique urinary drainage system which includes a unique disposable drainage bag and a unique disposable adapter for use therewith. The adapter is adapted to operably connect the drainage bag is a novel manner with a conventional catheter through a flexable drainage tube.

A serious problem with conventional urinary drainage systems is the large incidence of infection resulting from the use thereof. In such conventional urinary drainage systems, the catheter is connected to a drainage tube by means of a catheter adapter and urine flows through such tube to a container for collecting the urine. It has been found that infection is due in many cases to contact of the end of the drainage tube with contaminated objects resulting in migration of bacteria up the moist walls of the drainage tube and catheter into the patient. Also, the level of contaminated urine in the collecting container may rise until it contacts the end of the tube to thereby contaminate such tube. If the level continues to rise, the contaminated urine rises in the tube to create a harmful back pressure. The end of the drainage tube may also be contaminated by contact with a contaminated container, which has been improperly sterilized after having been used by another infected patient.

The assembly and setting up of most conventional urinary drainage systems at the bed site of the patient is also time consuming and complicated and in the process, contamination of the end of the drainage tube may result.

It is an object of the present invention to provide an improved, closed, inexpensive disposal urinary drainage system in which the danger of contamination leading to infection is substantially reduced and which is very light in weight, easily transportable, and exceedingly simple and convenient to set up and use without danger of contamination.

Another object is to provide an improved inexpensive, simple-to-manufacture, light-weight, easily transportable disposable plastic urinary drainage bag which has a unique, simple, disposable and inexpensive closure which effectively seals it until ready for use but which can be easily opened for use at the bed-site of the patient by a simple tearing operation without danger of contamination, such bag being particularly useful as a component part of the above-mentioned system of the present invention.

Another object is to provide such a disposable bag in which the closure also functions as a simple and convenient handle for carrying the bag.

Another object is to provide a disposable urinary drainage bag having a unique and ultra-simple built-in handle arrangement for conveniently carrying the bag.

The drainage bag of the invention in its preferred form comprises a flat, flexible bag made of a heat sealable, flexible, plastic sheet material and having a pair of flat side panels joined at the bottom and side edges. The closure comprises a pair of flat parallel panels of a material which is substantially stiffer than the flexible plastic bag and between which the upper edges of the bag and the portions of the bag adjacent such upper edges are sandwiched. The closure panels extend upwardly beyond the upper edges of the bag. The marginal portions of the closure panels beyond the upper edges of the bag panels are sealed or bonded together. The closure panels are also sealed or bonded to a substantial portion of the opposed bag panels sandwiched therebetween and such opposed bag panels to which the closure panels are sealed are also sealed or bonded together. This arrangement effectively seals the top of the bag. Another portion of the opposed sandwiched bag panels is not sealed or bonded to the closure panels and the opposed bag panels forming such portions are not bonded or sealed together either. The closure panels have registered, score or tear lines separating the portions thereof sealed to the bag panels and the portions which are not sealed to the bag panels to permit the last-mentioned portions to be severed from the first-mentioned portions and removed from the bag to thereby expose the upper edges of the bag panels which are unsealed together and which form an opening in the bag.

In a preferred embodiment, the registered score lines comprise vertical score lines extending from the top edges of the closure panels to the bottom edges and located intermediate the side edges of the closure panels as well as intermediate the side edges of the bag closer to one side edge than the other. The larger portions of the closure panels between the score lines and such other side edges thereof are provided with registered finger slots for conveniently carrying the bag. The areas of the closure panels which are sealed to the side panels of the bag and the areas of such bag panels which are sealed together are located on the handle side of the score lines. The areas of the closure panels which are not sealed to the bag panels and the areas of the bag panels which are not sealed together are located on the non-handle side of the score lines. When the closure panels are severed by tearing at the score lines, the smaller portions thereof on the non-handle side of the score lines can be removed from the bag to expose the unsealed upper edges of the bag located thereunder and thereby provide an opening at the top of the bag. The portions of the closure panels on the handle side remain sealed together and to the bag so that the opened bag can be conveniently carried. Thus, the closure panels perform a combined handle-closure function.

Yet another object of the invention is to provide an improved light-weight, inexpensive, simple-to-manufacture adapter adapted to be attached to the end of the urinary drainage tube and to be conveniently assembled with the above-mentioned bag or other type of drainage collector container at the bed-site to direct the flow of urine from the catheter and drainage tube into the opening in the bag or other container without danger of contamination of the end of the drainage tube or the bag.

The adapter and bag are designed to cooperate to ensure that the adapter will be secured firmly to the bag in the correct position with respect to the bag when the two are assembled at the bed-site.

The assembly at the bed-site of the adapter unit and bag is simple, convenient and fool-proof with a minimum danger of contamination. No instruments or clips are required.

The adapter protects the end of the drainage tube from contacting foreign objects and is provided with a simple, built-in overflow device below the end of the tube which ensures against the urine in the bag or other drainage collector container rising to a level at which it will contact the end of the drainage tube or flow up the tube.

Also built into the adapter is a means for limiting the distance which it can be inserted into the opening in the bag or other container. Preferably such means is a part of the overflow device and comprises a protective hood or flange which cooperates with the bag design to close the opening in the bag around the adapter to thereby protect the interior of the bag from contamination and prevent the escape of odors when the bag and adapter are assembled. Thus, the assembly of the adapter and bag provides a closed system. The hood or flange cooperates with the bag and closure design in a unique way to ensure against the adapter being assembled in any position other than the correct one and to firmly secure the adapter to the bag in such correct position without any clips or other elements.

The adapter may be assembled with the bag at the bed-site to thereby complete the assembly of the drainage system merely by (1) a single tearing operation to open the bag followed by (2) a simple movement of the adapter to its correct position in the opening in the bag in which position the above-mentioned overflow is achieved and the hood or flange closes the opening in the bag around the adapter to make the system a closed one. This same simple movement of the adapter with respect to the bag automatically brings together cooperating parts of the adapter and bag to firmly secure the adapter on the bag in the above-mentioned correct position. Although the adapter is firmly secured to the bag it can be removed from the bag by simply moving the adapter away from the bag. These cooperating parts ensure against improper assembly so that assembly is practically fool-proof as well as simple and convenient.

The end of the drainage tube is protected from contact with foreign objects by the adapter at all times before, during and after assembly. The end of the drainage tube is located within the adapter in such a manner so as to permit flow from the tube through the adapter into the bag or other container without wetting the portions of the adapter adjacent to the end of the drainage tube. This feature cooperates with the overflow features to ensure against a moist bacteria track to the end of the tube.

Another object is to provide a unique, simple, inexpensive, disposable support which cooperates with the peculiar bag design of the present invention to support such bag.

Another object is to provide a unique and simple support which cooperates with the peculiar bag design of the present invention to support a plurality of the bags in close relationship with each other during use so that when one bag is filled the adapter can be easily changed from the full bag to an empty bag with a minimum of time and effort, a minimum of spillage and a minimum chance of introducing contamination.

The above-mentioned objects and advantages of the present invention as well as other objects and advantages will more fully appear from the following description made with reference to the accompanying drawings wherein like reference characters refer to the same or similar parts throughout the several views and in which:

FIG. 1 is a front view in elevation of an embodiment of the sealed urinary drainage bag and closure assembly of the present invention.

FIG. 2 is an enlarged view taken along the line 2—2 of FIG. 1.

FIG. 3 is an enlarged view taken along the line 3—3 of FIG. 1.

FIG. 4 is an enlarged view like FIG. 1 of the drainage bag closure, the area of the closure panels sealed to each other and to the bag being shaded and the areas of the closure panels which are not sealed to each other and to the bag being unshaded. At the shaded area overlying the bag panels, the bag panels are sealed together as well as to the closure panels whereas at the unshaded area overlying the bag panels, such panels are neither sealed together or to the closure panels.

Figure 5:
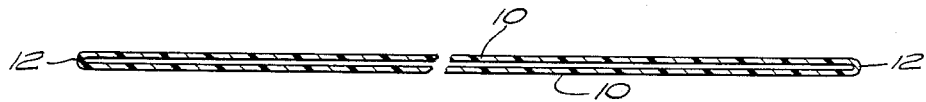
Figure 6:
Figure 7:
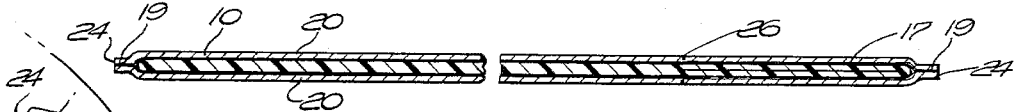
Figure 8:
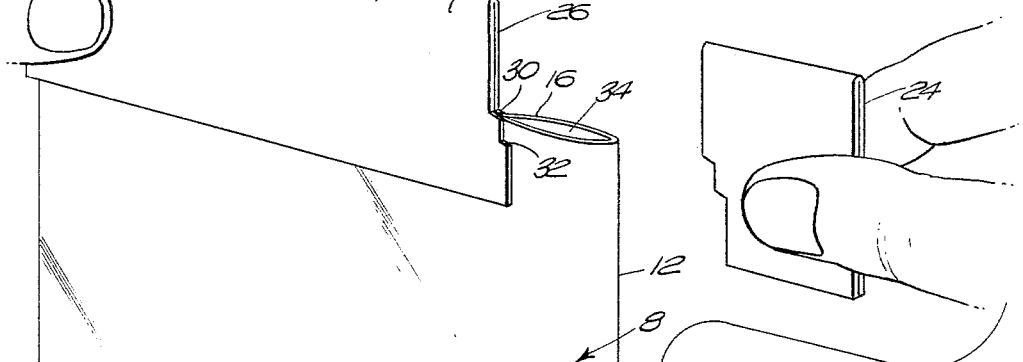

FIG. 5 is a view taken along the line 5—5 of FIG. 1.
FIG. 6 is a view taken along the line 6—6 of FIG. 1.
FIG. 7 is a view taken along the line 7—7 of FIG. 1.
FIG. 8 is a view like FIG. 1 after the portions of the closure panels which are unsealed to the bag but to each other have been removed at the bed-site by tearing along the score lines of the closure panels to expose an opening in the bag.

FIG. 9 shows the opened bag of FIG. 8 with an embodiment of the adapter of the present invention assembled therewith and ready for use, the drainage tube being attached to the adapter at one end and to a conventional catheter adapter at the other end.

FIG. 10 is a view taken along the line 10—10 of FIG. 9.

FIG. 11 is a view taken along the line 11—11 of FIG. 10.

Figure 12:
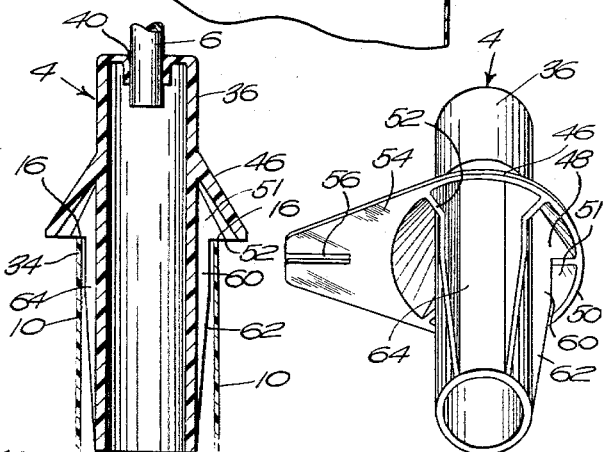

FIG. 12 is a view taken along the line 12—12 of FIG. 10.

Figure 13:
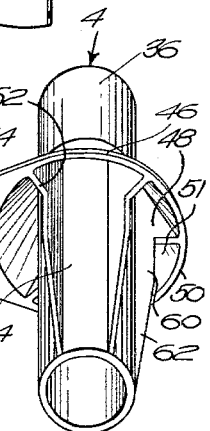

FIG. 13 is a bottom view in perspective of the adapter of FIG. 9.

Figure 14:
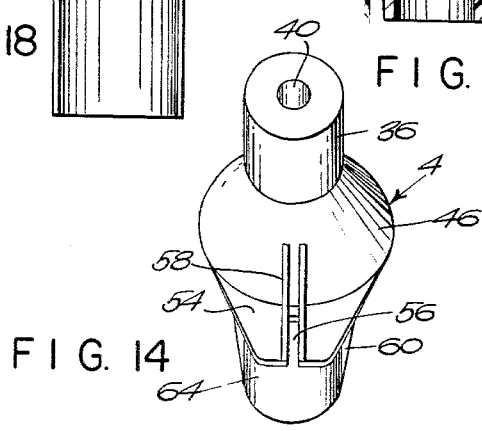

FIG. 14 is a top view in perspective of the adapter of FIG. 9.

FIG. 15 is a view like FIG. 9 showing another embodiment of the adapter of the present invention.

Figure 16:
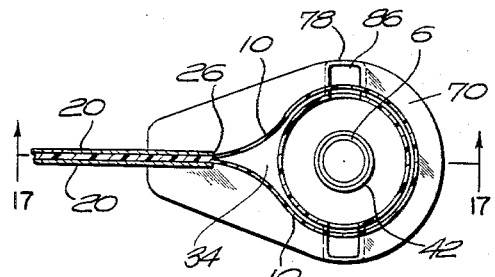

FIG. 16 is a view taken along the line 16—16 of FIG. 15.

Figure 17:
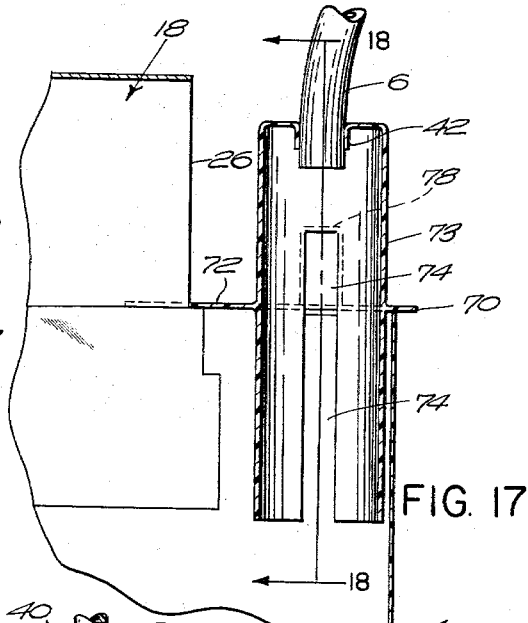

FIG. 17 is a view taken along the line 17—17 of FIG. 16.

Figure 18:
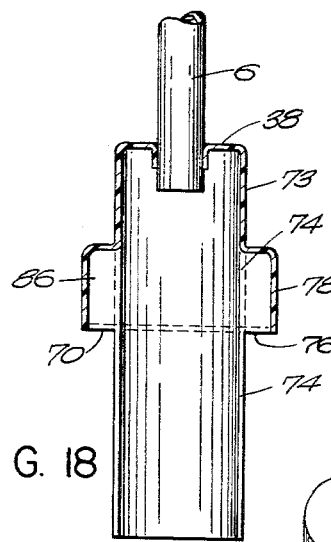

FIG. 18 is a view taken along the line 18—18 of FIG. 17.

Figure 19:
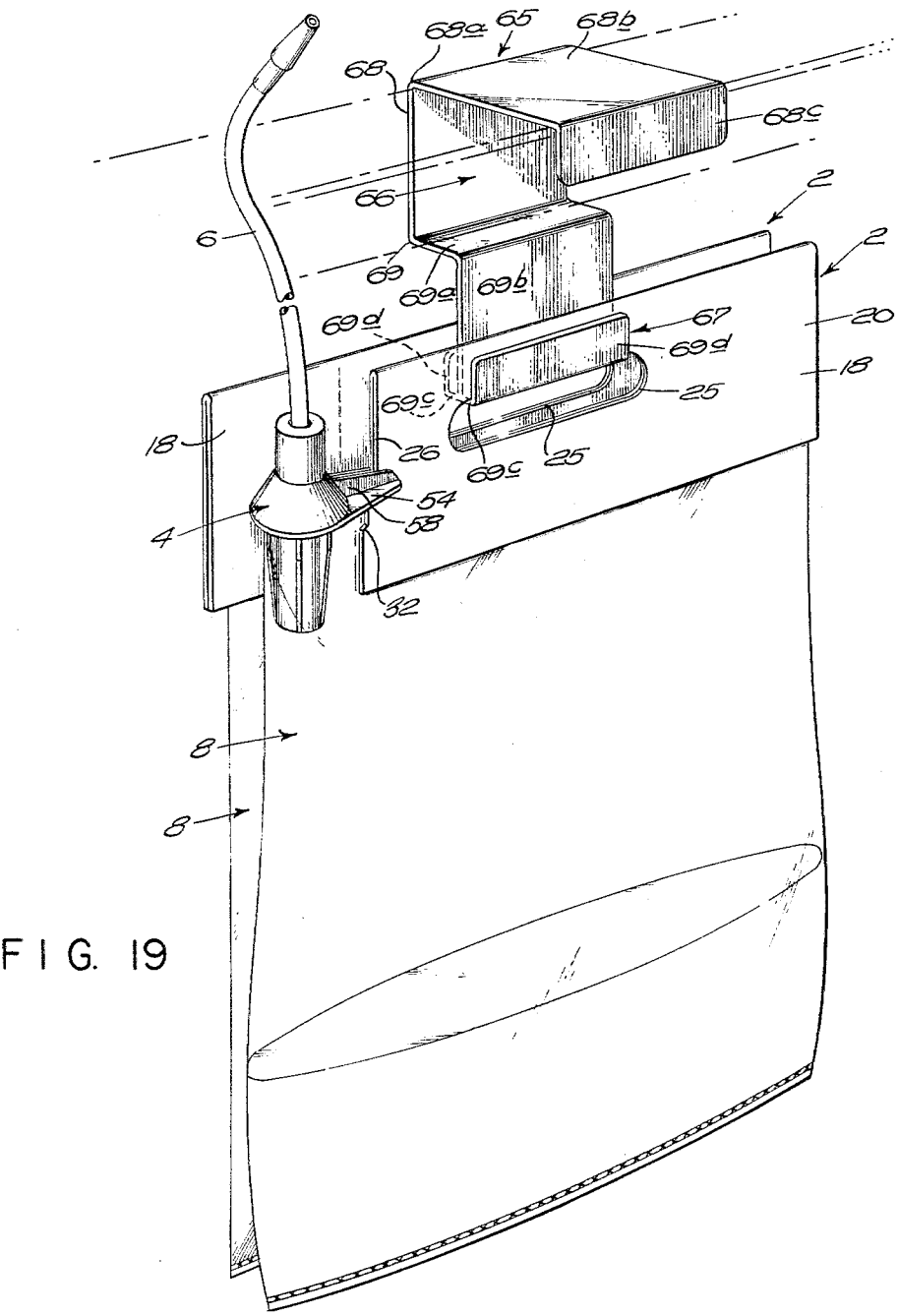

FIG. 19 is a view in perspective of a pair of drainage bags according to FIG. 1 supported in accordance with the present invention by a unique supporting hook on the rail of a bed during use with the adapter of FIG. 9 assembled with one bag which is being filled and with the other stand-by bag being held by the hook in a position in which the adapter can be conveniently changed over to it when the first bag has been filled.

FIG. 20 is a view in perspective of another modification of the adapter of the present invention and of the top portion of the bag adjacent the bag opening to provide a modified manner of assembling the adapter with, and holding it on, the bag, the parts being shown during assembly.

FIG. 21 is a view in perspective of the side of the adapter of FIG. 20 opposite from that shown in FIG. 20.

FIG. 22 is a front view in elevation of the assembled bag and adapter of FIG. 20.

FIG. 23 is a section taken along the line 23—23 of FIG. 22.

FIG. 24 is a section taken along the line 24—24 of FIG. 22.

FIG. 25 is a view in perspective of yet another modification of the adapter of the present invention and of the top portion of the bag adjacent the bag opening to provide yet another modified manner of assembling the adapter with, and holding it on, the bag, the parts being shown during assembly.

FIG. 26 is a view like FIG. 25 during a later stage of assembly.

FIG. 27 is a view like FIG. 25 with assembly complete.

FIG. 28 is a view in elevation of the adapter of FIG. 25.

FIG. 29 is a top plan view of the adapter of FIG. 28.

Figures 30, 31:
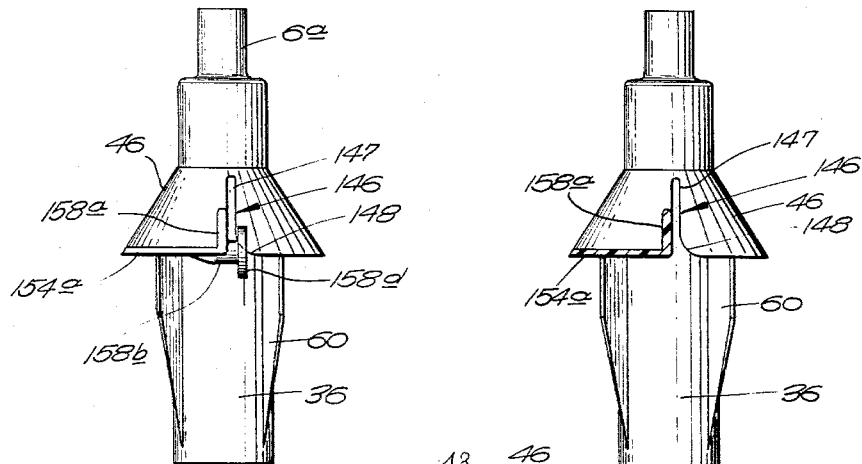

FIG. 30 is a view taken along the line 30—30 of FIG. 29.

FIG. 31 is a section taken along the line 31—31 of FIG. 29.

Figure 32:
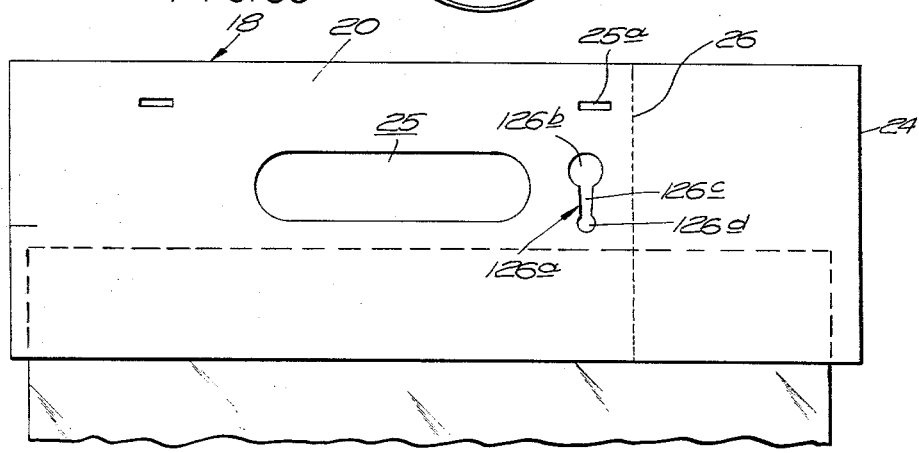

FIG. 32 is a view in elevation of the top portion of the bag of FIG. 25 prior to removal of the portion of saddle 18 to the right of score line 26.

Figure 33:
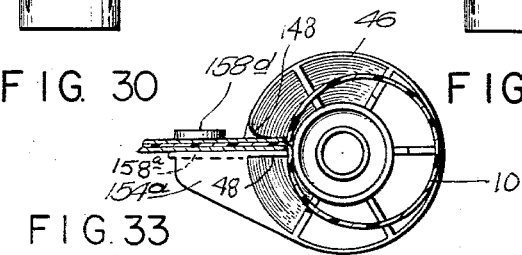

FIG. 33 is a section taken along the line 33—33 of FIG. 27.

With reference to the drawings, 2 represents an embodiment of the disposable drainage bag and closure assembly of the present invention and 4 represents an embodiment of the adapter of the present invention to which the flexible, transparent, plastic (vinyl resin or polyethylene) drainage tube 6 is attached as hereinafter described.

The disposable drainage bag and closure assembly 2 comprises a flat flexible bag 8 made of flexible, heat sealable polyethylene sheet material, preferably transparent. The bag comprises a pair of parallel, flat, side panels 10 joined at their side edges 12 by folds 13, and heat sealed together along their bottom edges at 14 as shown in FIGS. 1 to 3. In effect, bag 8 comprises a flexible sheet or film of heat sealable polyethylene in the form of a flattened tube, the bottom edges of which are heat sealed together. The upper edges 16 of the bag are closed by a closure element or saddle 18 comprising a sheet of relatively stiff, polyethylene lined cardboard folded at 22 saddle fashion downwardly over the upper edges 16 into a pair of flat parallel closure panels 20 which extend along substantial portions of the bag panels 10 adjacent upper edges 16. Such portions of the bag are sandwiched between the closure panels 20, as shown. Closure panels 20 extend upwardly beyond the upper edges 16 of the bag panels to the fold 22. They also extend sideways beyond the side edges 12 of the bag panels and terminate at side edges 24.

The middle portions of closure panels 20 are provided with registered, horizontal, elongated finger slots 25 located slightly above the upper edges 16 of the bag panels for conveniently holding the bag.

Closure panels 20 are also provided with registered vertical score or tear lines 26 (lines of perforations) extending from the top edges thereof (the fold 22) to the lower edges 28 thereof and located intermediate the right side edges 24 (as viewed in the drawings) of the closure panels and the finger slots and intermediate the right side edge of the bag and the finger slots. Actually, score lines 26 comprise a single score line extending across the cardboard saddle 18 perpendicular to the fold line 22. When the element 18 is folded along such fold line into panels 20, the portion of such score line in each panel registers with the portion in the other. This same folding operation brings the two finger slots in the saddle in register with each other.

Score lines 26 are provided with registered shoulders 30 intermediate their ends and located opposite and on the same level as the upper edges 16 of the bag panels. They are also provided with second registered shoulders 32 located below first shoulders 30.

The inside surfaces of the cardboard closure strip 18 (inner surfaces of closure panels 20) are coated with a heat sealable polyethylene liner or film 17 (FIGS. 2 and 7) adhered thereto. Such coated cardboard is available on the market.

The inner polyethylene lined surface areas of the flat, parallel, closure panels 20 from the score lines 26 to the left side edges 24 of the closure panels (the areas to the left of score lines 26) are heat sealed to each other and to the portions of the side panels of the bag sandwiched therebetween. Such portions of the side panels of the bag to the left of the score lines and sandwiched between the closure panels are also heat sealed together. The inner polyethylene lined surface areas of closure panels 20 from the score lines 26 to the right side edges 24 of the closure panels (the areas to the right of the score lines) are heat sealed to each other but not to the portions of the side panels of the bag sandwiched therebetween. Such portions of the side panels of the bag to the right of the score lines and sandwiched between the closure panels are unsealed. The abovementioned areas which are heat sealed are shaded in FIG. 4. The unsealed areas 23 are not shaded. Thus, with reference to FIG. 4, the areas of the closure panels to the left of the score lines above the upper edges 16 of the bag panels and to the left of the left side edge of the bag panels are heat sealed to each other by fusion together of the polyethylene liners 17 thereof. The fused polyethylene liners are indicated by the heavy line 19 in FIGS. 2, 3 and 6. The areas of such closure panels to the left of the score lines which overlie the bag panels (areas below the upper edges 16 and between the score lines and the left side edge of the bag panels) are heat sealed to the bag panels sandwiched therebetween and such sandwiched areas of the bag panels are heat sealed together by fusion of the polyethylene liners of the closure panels together with the polyethylene bag panels sandwiched therebetween (see FIGS. 3 and 7). Although the areas of the closure panels to the right of the score lines above the upper edges 16 of the bag panels and beyond the right hand edge 12 of the bag are sealed together by fusion of the polyethylene liners thereof, the areas overlying the bag panels between score lines 26 and the right side edge 12 of the bag panels (areas below the upper edges 16) are not sealed to the bag panels. Nor are the sandwiched areas of the bag panels between the score lines and the right side edges of the bag sealed together. Although the lower boundary of the areas of the closure panels sealed to each other to the right of the score line and above the upper edges 16 is close to such upper edges in FIG. 4, it may be at any height above such upper edges so long as there is a substantial sealed area between the closure panels above the upper edges and outwardly beyond the right side edge of the bag.

Because of the heat sealable polyethylene liner, the above-mentioned sealing is provided simply by contacting the outer surfaces of the closure panels with a hot iron or press at the areas where sealing is desired after the cardboard closure element is folded over the upper edges of the bag in the correct position. Where the lined cardboard closure panels contact each other, the polyethylene flows together to seal the panels together. Where the polyethylene lined closure panels contact the bag panels, the polyethylene of the liners and of the bag panels all flow together to seal the enclosure panels and bag panels together.

The closure panels, after heat sealing, as aforesaid, effectively seal the polyethylene bag until it is ready for use.

Thus, the cardboard saddle 18 functions as a closure for the bag as well as a convenient handle for carrying and holding the bag.

It is apparent that because no part of the bag to the right of the score line is sealed to the closure panels 20, the portion of the closure panels to the right of such score line can be easily removed from the bag at the bed-site when the bag is ready for use merely by grasping the portion of the relatively stiff cardboard closure member to the left of the score line with the fingers of one hand and the portion to the right of the score line with the fingers of the other hand, followed by bending the closure member at the score line to sever it at such line whereafter the small segment to the right of the score line can be removed from the bag as shown in FIG. 5 to thereby expose a small opening 34 in the top of the bag formed by the upper unsealed edges 16 to the right of the score line and into which the adapter 4 is adapted to be placed as shown in FIG. 9.

One of the side panels of the bag has printed thereon graduations for indicating the amount of liquid in the bag at various levels. Preferably, the graduations comprise a solid block of an opaque color 27, which screens the liquid, with horizontal graduated lines 29 of a different color, e.g. white, and with an elongated, unprinted area or window 31 of the transparent polyethylene plastic through which a small portion of the level of the liquid can be seen.

Adapter 4 comprises a hollow, relatively rigid, plastic, e.g. polystyrene, cylinder 36 (preferably transparent) having a top end wall 38 with an opening 40 (see FIG. 11) in the center thereof forming the mouth of a small, hollow cylindrical projection 42 integral with end wall 38 and extending axially inwardly into the cylinder 36 a short distance, the outer diameter of the projection 42 being substantially smaller than the inner diameter of cylinder 36 so that the periphery thereof is spaced radially inwardly from the inner wall of the cylinder. The projection 42 snugly receives the end of the flexible, transparent, plastic drainage tube 6 as shown in FIGS. 9 and 11 with the end of the tube extending slightly below the end of the projection. The end of the tube is chemically bonded or cemented to the inner wall of the projection by conventional bonding adhesives. The other end of the tube 6 has attached thereto a standard catheter adapter 44 adapted to be secured in the end of a conventional catheter (not shown). Preferably, the catheter adapter is provided with a conventional cap or shield (not shown).

It is apparent that in the above-described construction the cylinder 36 protects the end of the drainage tube received therein from contact with contaminated objects even if the adapter is accidentally dropped. Also, with such an arrangement, urine flows from the tube through the cylinder 36 into the bag without wetting the inner surfaces of the cylinder so that at least the top portion of the inner surfaces of such cylinder 36 adjacent the end of the drainage tube remains dry. Consequently, even if the lower end of the cylinder 36 is contaminated, there is no moist bacteria track to the lower end of the drainage tube along which the bacteria can travel.

Intermediate the ends of the cylinder 36 and located well below the end of the projection 42 and the end of the drainage tube 6, the cylinder is provided with a hood or flange 46 extending integrally outwardly and downwardly from the cylinder periphery. The hood 46 is conical in contour and is located closer to the top of the cylinder than the bottom. The hood is provided with a plurality (five in the drawings) of vertical ribs 48 which extend integrally and radially inwardly from the inner wall of the hood to the periphery of the cylinder with which they are integral. These ribs divide the space between the hood and cylinder periphery into five chambers 51, which are open at the bottom.

The lower edge 50 of the hood and the lower horizontal edges 52 of the ribs lie in the same plane. One side of the lower edge 50 of the hood extends into a horizontal, tear-shaped flange extension 54 having a slot 56 in the tapered end thereof. The lower surface of the flange extension 54 lies in the same plane as the lower edge 50 of the hood and the lower horizontal edges 52 of the ribs 48. The side edges 57 of flange extension 54 are tangent to the circular outer periphery of the lower edge 50 of the hood as shown in FIG. 10. A rib extends to each of the tangent points on the lower edge of the hood from which the sides 57 of the extension flange extend. The chamber 51 formed by these two ribs, the hood and the cylinder periphery is larger than the other four chambers formed by the ribs, the other four chambers being equal in size.

A pair of parallel vertical walls 58 rise integrally upwardly from the extension flange 54 adjacent the walls of the slot 56, such vertical walls extending from the end of the extension flange radially inwardly to the outer wall of the hood with which they are integral. The inner surfaces of walls 58 register with the side walls of the slot.

The radially inner portions of ribs 48 adjacent the periphery of the cylinder 36 extend downwardly into vertical, radial fins 60 which are integral with the ribs and the periphery of the cylinder 36 and which taper radially inwardly at 62 to the cylinder periphery. The fins 60 form vertical peripheral channels 64. The taper of the fins facilitates insertion to the position shown in FIG. 9 of the lower part of the cylinder below the hood 46 into the opening 34 in the bag exposed by removal of the pieces of the closure member 18 to the right of the score lines 26.

When the adapter is in this position, the lower horizontal edges 52 of ribs 48 and the lower surface of flange extension 54 engage the upper edge 16 of the plastic bag forming the opening 34 to prevent the adapter from being moved further into the opening. The hood 46 and flange extension 54 extend outwardly over and beyond such upper edge 16 of the bag and hence, outwardly over and beyond the opening 34 to close the opening and thereby protect against foreign matter from falling into the opening and prevent the escape of odors. Note how when the lower tapered portion of the adapter is inserted into the opening 34 to spread it, the opening has a tear-shaped portion where the upper edge 16 of the bag extends between the closure panels 20 and how the tear-shaped contour of the extension flange 54 covers this portion of the opening. Note also how the open bottoms of the chambers 51 straddle the upper edge of the opening.

The slot 56 and the vertical walls 58 of the adapter snugly embrace the scored and severed edge portion 26 (FIG. 9) of the remaining part of the closure member 18 sealed to the bag to hold the adapter firmly on the bag in the position shown and against rotational movement in the opening. Engagement of the lower surface of the extension flange 54 with the shoulder 30 of such severed edge of the closure member 18 prevents the adapter from moving further into the opening in the bag. This is necessary because although the lower surfaces of the ribs and extension flange engage the upper edges of the bag, such upper edges are flexible and collapsible, whereas the cardboard is relatively stiff. The portion of the cardboard closure member below the lower shoulder 32 functions to narrow the opening 34 while permitting the entrance to the opening to be larger for easy entry of the lower portion of the adapter into the opening.

The fins 60 and the cylinder periphery between such fins form with the inner surface of the adjacent wall of the bag opening, vertical channels 64 located within the bag and below the upper edge of the bag forming the opening, which channels communicate with the chambers 51 formed by the ribs 48, hood 46 and periphery of the cylinder. These chambers are located outside of the bag above the edge of the bag forming the opening and extend radially outwardly beyond such upper edge. Thus, the channels 64 and chambers 51 form overflow channels through which the urine in the bag overflows when the bag becomes filled to thereby prevent the urine from rising to the end of the tube 6. The overflow path is vertically up the channels 64 into the chambers 51 above the edge of the opening, then radially outwardly in the chambers beyond the edge of the opening and then vertically downwardly to the atmosphere.

This arrangement of fins, ribs, hood and flange extension then performs the functions of (1) closing the opening in the bag to provide a closed system while at the same time, (2) providing for overflow to prevent the urine from ever rising to a level at which it will contact the end of the drainage tube, (3) automatically securing the adapter to the bag in the correct position, without clips or other elements simply by moving it to such position, (4) preventing the adapter from being inserted too far into the opening and (5) ensuring against the adapter being moved to any position but the correct one by guiding it to the correct position.

The simplicity and ease in setting up or assembling of the bag and adapter for use will be apparent when it is remembered that the bag can be opened by a simple tearing operation without touching the exposed edge of the opening. The adapter can then be easily placed and secured in the correct position on the bag by a single movement thereof into the exposed opening, the slot 56 in the extension flange 54 being moved around and along the severed vertical edge 26 of the cardboard closure member by the same movement. When the extension flange engages the shoulder 30, the adapter is automatically secured in the right position and cannot be inserted further into the opening. The taper 62 of the fins 60 spreads the opening in the bag as the adapter is inserted to facilitate insertion. The apparatus is now ready for use. Assembly is foolproof.

The slot 25 provides a convenient handle for transporting the empty and full bag and can be easily placed on a hook supporting the bag on a stand or on the bed, as will be described in more detail hereinafter.

Until ready for use, the bag remains sealed and it is easily opened, as aforesaid, at the bed-site. In the event the adapter comes in contact with contaminated objects, e.g. if it is dropped, the edge of the tube 6 is protected.

As aforesaid, the urine flows from the tube 6 into the bag without touching the upper walls of the cylinder 36 adjacent the end of the tube 6 so that they remain dry. Consequently, even if the level of the liqiud should rise to the top of the bag and overflow occurs, and even if the lower part of the cylinder 36 becomes contaminated in some other way, infectious organisms are blocked from traveling upwardly to the end of the tube by the dry area since movement of the organisms requires a moist bacteria track.

The adapter of the present invention may be used with any kind of drainage collecting container, as for example a glass bottle with an opening in which the adapter can be placed.

The important thing, whether the adapter is used with the bag as shown in the drawings or another kind of container, is the combination in the assembly of the adapter and container of (1) the end portion of the drainage tube extending into the interior of the hollow tubular member 36 and being spaced radially inwardly from the inner wall of such member to provide drainage from the drainage tube through the adapter into the container without establishing a moist bacteria track to the end of the drainage tube, (2) means to limit the distance to which the adapter can be inserted into the opening in the container to ensure against the adapter dropping to or being placed in a position within the bag in which the liquid in the bag will contact the end of the drainage tube, and (3) overflow means preventing the liquid from rising to the end of the drainage tube. It is this combination which prevents contamination of the drainage tube. Instead of the flange arrangement shown in the drawings the hollow tubular member 36 may have a frusto-conical shape or portion, i.e. tapered from top to bottom, wherein the engagement of the wider top portion with the wall of the container opening limits the movement of the adapter into the container opening in the manner of a stopper, with a peripheral channel or groove or other means for providing overflow; or the container opening may be provided with a ledge which engages a parts of the adapter, e.g. the bottom edge, to limit the entry of the adapter into the container opening; also the overflow means may be built into the container instead of the adapter.

Another feature of the present invention is the unique manner shown in FIG. 19 of supporting a plurality of the bags (two in FIG. 19) by a unique multi-hook (triple hook in FIG. 19) construction 65 which is adapted to be easily hooked and unhooked over a bed rail or other supporting structure by an upper hook portion 66 and to the lower hook portions 67 of which a plurality of bags are adapted to be easily hooked and unhooked by means of the finger slots 25 in the combined handle-closure cardboard elements 18 of the bags. More particularly, the multi-hook construction comprises a flat piece of steel having a vertical section 68 the top of which is bent at right angles at bend 68a into a horizontal portion 68b and then downwardly at bend 68c to form the upper hook portion 66 adapted to be hooked over the bed frame, as shown in FIG. 19. The lower end of section 68 is bent at right angles at 69 in the same direction as bend 68a to form a horizontal section 69a which extends for a distance about half the distance of portion 68b and then downwardly into a vertical section 69b located under the bed rail. The lower end of vertical section 69b extends to the right and left at 69c in a perpendicular, horizontal direction, and each horizontal section 69c bends upwardly into a portion 69d to thereby form a double hook, one on each side of the vertical section 69b. Each of the double hooks is adapted to receive the portion of the cardboard closure-handle 18 above the slot 25 of a bag 8, as shown in FIG. 19. The width of each hook between sections 69b and 69d is slightly greater than the thickness of the cardboard closure-handle element 18; the height of sections 69d is slightly less than the vertical width of slots 25 of element 18; and the width of the flat piece of steel from which the hook is made is slightly less in dimension than the straight horizontal edges of the slots. Consequently, a bag can be easily hooked over each of the double hooks by moving the slot 25 thereof over the section 69d followed by lowering the portion of the cardboard element above the slot downwardly between sections 69b and 69d forming the hook. The bag can be just as easily removed by reversing the above steps.

The advantage of this arrangement is that two bags can be mounted side by side in close proximity to each other at the same time. The adapter is assembled with one of the bags, as aforesaid, and while that bag is being filled, the other bag is used as a standby bag to which the adapter can be conveniently transferred after the first bag has become full. The close proximity of the bags and the like parts thereof (especially the edges 16 forming the openings in the bags) to each other permits the transfer to be made with a minimum of effort and time and with a minimum chance of contaminating the adapter during the transfer. At no time, is it necessary to lay down the adapter in order to prepare the second bag, since the second bag is opened merely by a twist of the wrist, as aforesaid, immediately before the adapter is transferred.

Another embodiment of the adapter is shown in FIGS. 15 to 18. In this embodiment, the hood or flange 70 extending from the periphery of the cylinder is horizontal. When the adapter is assembled with the bag in the correct position, as shown in FIG. 15, flange 70 protrudes radially outwardly over and beyond the upper edge 16 of the bag forming the opening to close the opening and prevent further insertion of the adapter into the opening. Flange 70 has a tear-shaped extension flange 72 having a slot in the end thereof which embraces the severed vertical edge 26 of the closure member 18 to firmly secure the adapter to the bag in the correct position. The lower surface of flange extension 72 engages the shoulder 30 of the relatively stiff closure member to prevent the adapter from moving any further into the opening in the bag.

The vertical overflow channels in this embodiment comprise two oppositely disposed vertical slots 74 in the cylinder 73 which extend from the bottom edge of the cylinder upwardly beyond the horizontal flange 70. The flange 70 is also slotted at 76 where the slots 74 intersect it. A housing 78 made up of vertical side walls 80, a vertical front wall 83 and a horizontal top wall 84, encloses the portion of each slot 74 above the main flange 70, the walls of the housing being integral with the cylinder and flange. Walls 80, 82 and 84 may be considered as a part of flange 70 which follows the contour of the walls of the slot above the main part of the flange. Thus, the flange extends vertically upwardly at one side wall 80, then horizontally at 84 and 82 and then vertically downwardly again at the other side wall 80 to form the housing 78. The two housings 78 and the portions of slots 74 enclosed thereby form a pair of open-bottomed chambers 86 located above the upper edge 16 of the bag forming the opening and extending radially outwardly beyond such upper edge. The slots 74 below the edge 16 of the bag communicate with such chambers to form overflow channels which function like the overflow channels of FIG. 9. However, the channels in FIG. 14 are in part in the wall of the cylinder whereas the channels in FIG. 9 are outside the cylinder. Note for example, how chambers 86 in FIG. 14 correspond to chambers 51 in FIG. 9 in that they are located above the opening in the bag and extend radially outwardly beyond the upper edge of the bag forming such opening and how the slots 74 below the flange 70 correspond to the channels 64 of FIG. 9. In both, the flange covers the opening in the bag outside the cylinder, considering housing 78 as part of the flange in FIG. 14. The lower edges of the ribs 48 in FIG. 9 correspond to the main portion of flange 70 in that they engage the upper edge of the bag forming the opening. The same effect would be achieved in FIG. 14 by providing housings 78 so closely together that they are separated only by a wall thickness which would correspond to the ribs 48. In such case, however, the slots 74 would be spaced so closely together that the resulting structure would be too weak, but the principle is the same.

A modification of the FIG. 9 embodiment of the adapter together with a modification of the bag for assembly with the modified adapter are shown in FIGS. 20-24. Such modified adapter is the same as that shown in FIG. 9 except that half of the flange extension 54 together with its vertical wall 58 are removed, leaving only the half flange extension 54a, the outer edge 57a of which is tangent to the lower edge of hood 46 like 57 but the inner edge 57b of which extends perpendicularly outwardly from the lower edge of the hood along a line forming an extension of a diameter of such lower edge, as shown in FIGS. 20-24. Inner edge 57b has vertical wall 58a extending upwardly and integrally therefrom, such wall also being integral with the outer surface of the hood 46. The upper edge of wall 58a is horizontal. This wall 58a corresponds to wall 58 of the FIG. 9 embodiment. The outer end of vertical wall 58a extends at an angle of about ninety degrees a short distance into a vertical wall 58b slightly less in height than wall 58a. The lower surface of the extension flange 54a and walls 58a and 58b lie in the same plane as the lower edge of hood 46. The end of the wall 58b extends integrally into a vertically disposed cylindrical shaped rod 58c which extends upwardly at 58d beyond the upper edges of walls 58b and 58a. The hood 46 in FIGS. 20-24 has an extra vertical rib 48 as compared to FIG. 9, such rib lying in the same plane as wall 58a between the portion of the hood 46 to which wall 58a is joined and the cylindrical member 36, but such rib does not have any fin 60 (see FIGS. 23 and 24).

The above described arrangement of the adapter of FIGS. 20-24 cooperates with a slot 26a in the portion of the cardboard closure 18 sealed to the bag and located to the left (as viewed in FIG. 22) of the perforated tear line 26 (in this embodiment such line is a straight vertical line and has no shoulders) to attach the adapter to the bag. Slot 26a is located above the top edge 16 of the bag panels and closely adjacent tear line 26. The lower horizontal edge 26b of the slot 26a is at about the same level as the top edge 16 of the bag. The right (as viewed in FIG. 22) edge 26c of the slot adjacent line 26 is vertical and parallel to line 26. The left (as viewed in FIG. 22) edge 26d of the slot is inclined about 25° from vertical. The upper end of edge 26d extends at a right angle at 26e a short distance and then downwardly at an inclination at 26f parallel to wall 26d and then horizontally at 26g to the vertical edge 26c of the slot. The result is to provide a slot 26a having a main horizontal portion 26h and an inclined extension portion 26i. The dimension of edge 26d and the inclined extension portion 26i of the slot defined thereby and by edges 26e and 26f is only very slightly greater than the height of rod member 58c of the adapter of FIGS. 20 to 24. The height of the main horizontal portion 26h of slot 26a between lower horizontal wall 26b and upper horizontal wall 26g is only slightly greater than or about the same as the height of wall 58b of the adapter but less than the height of wall 58a of the adapter.

The width of the wall 58b of reduced height from wall 58a to rod 58c is only slightly greater than or about the same as the thickness of the closure member 18, i.e. the double thickness of the cardboard panels 20 forming such closure member.

The increased heights of wall 58a and rod 58c as compared to wall 58b provide the effect of a slot 58f in the top of the overall wall assembly 58a, 58b and 58c, the side walls of such slot comprising the top part of wall 58a extending upwardly beyond 58b and the top part 58d of rod 58c extending upwardly beyond wall 58b, the width of the slot being slightly greater than or about the same as the thickness of the cardboard closure member 18.

The adapter of FIGS. 20-24 is attached to the bag as shown in FIGS. 20, 22 and 23, after the portion of the closure panels to the right (as viewed in FIG. 22) of the perforated line 26 has been removed, by first inserting the portion of the adapter below the hood 46 into the opening of the bag while at the same time inclining and positioning the adapter so that the rod 58c is inclined and is aligned with the inclined extension portion 26i of slot 26a, as shown in FIG. 20. In this position the adapter is located at one side of the closure member 18. Thereafter, the rod member 58c while so inclined and positioned is moved sideways into and through inclined extension portion 26i of the slot 26a to the opposite side of closure member in which position the wall 58b is located in the slot. Thereafter, the adapter and hence walls 58a and 58b and rod portion 58c are moved to vertical positions and at the same time moved sideways toward the edge 26 of the closure member to thereby move wall 58b into the main horizontal portion 26h of slot 26a and toward and against the vertical edge 26c of the slot. The adapter is then swung about the vertical edge 26c and with respect to the closure member to bring the wall 58a flush against the side of the closure member with the lower edge of the hood 46 adjacent wall 58a against edge 26 of the closure member, as shown in FIGS. 22-24. In this position the vertical wall 58b of reduced height is received in the main portion 26h of the vertical slot 26a against edge 26c of the slot with the upper and lower edges thereof substantially in contact with the upper and lower edges of the slot and with rod member 58c on one side of the slot and extending upwardly beyond the slot flush against the corresponding side of the closure member and with the wall 58a on the other side of the slot and extending upwardly beyond the slot and flush against the corresponding other side of the closure member, as shown in FIG. 23. In effect, the upper and lower edges of the slot confine the upper and lower edges of wall 58b therebetween and the portions of rod 58c and wall 58a extending above the slot confine the portion of the closure member therebetween to hold the adapter firmly in position on the closure member with the lower part of the adapter in the bag opening.

The length of wall 58a is about the same dimension as the distance between the vertical edge 26c of the slot and the severed edge 26 of the closure member. Therefore, the portion of the closure member between vertical edge 26c of the slot and edge 26 of the closure member is confined between wall 58b and the lower edge of hood 46 which is in engagement with the edge 26 of the closure member, as shown in FIGS. 22 and 24. This prevents sideways movement of the adapter in a direction parallel to the longitudinal length of wall 58a. This also brings the lower edge of the hood to the edge 26 so that the opening in the bag remains covered by the hood. See FIG. 24.

The adapter is removed from the bag quite simply by swinging the adapter about the vertical edge 26c of the slot to one side of the closure member (wall 58a is swung away from the side of the closure member). Thereafter, the wall 58b is slid in the slot 26a away from edge 26c of the slot until the rod member 58c reaches the opposite inclined side of the slot, whereafter the adapter is inclined until the rod member 58c registers with the inclined portion 26i of the slot followed by moving the rod member 58c sideways out of the slot, whereupon the adapter can be lifted out of the opening in the bag.

In the adapter shown in FIGS. 20–24, a short length of rigid plastic tubing 6a is sealed in the opening 40 of the top wall 38 of the adapter and the end of the flexible drainage tubing 6 is sealed over the upper end of such tube 6a. Tube 6a extends inwardly into the hollow member 36 and outwardly of the top wall 38, the inwardly extending portion being spaced radially inwardly from the inner wall of member 36.

In the embodiment shown in FIGS. 20–24, the closure memebr 18 is provided with a pair of horizontal rectangular shaped slots 25a at its upper corners for cooperation with a pair of light, disposable, inexpensive hangers 65a, which may be of plastic, which are H-shaped in cross section and each of which has the general configuration of a question mark without the dot. The lower vertical stem oprtion 65b of each hanger has a small T-shaped projection 65c (FIG. 23) extending sideways therefrom at an angle of 90°.

The top portion 65d of each question-mark-shaped hanger comprises a hook for hooking over a bed rail or other support.

The head 65e of the T-shaped projection 65c is parallel to vertical stem portion 65b, is normally vertical and is slightly shorter than the horizontal width of each of the slots 25a. The length of the stem 65f of the T, i.e., the distance between the head 65e of the projection and the surface of the portion 65b from which it projects, is about the same as the thickness of the closure member 18, i.e. the double thickness of the closure panels.

The hangers are attached to the bag by holding the hangers horizontally to align the heads 65e of the projections with the slots 25a. Thereafter, heads 65e are pushed into and through the slots to bring the stems 65f of the projections into the slots, whereupon the hangers are rotated about the axes of the stems of the T's to vertical positions in which positions the stems are located in the slots with the closure member being confined between the heads 65e of the T's and the portion 65b of the hanger.

After the two hangers are attached to the bag, the bag is suspended by them on a bed rail or other support.

The embodiment shown in FIGS. 25 to 33 is like of FIGS. 20 to 24 except for the means for attaching the adapter to the closure panels 20, i.e. the FIGS. 25 to 33 embodiment has a different shaped adapter attaching slot in the closure panels 20 and the portion of the adapter corresponding to parts 58b, 58c and 58d in the FIGS. 20–24 embodiment is modified to cooperate with the different shaped slot. Also, a slot 146 is provided in the hood 46 to snugly receive the serrated edge portion of the panels 20, as will be discussed in greater detail below.

In FIGS. 25 to 33, the slot 126a is a vertical keyhole-shaped slot having an enlarged circular-shaped upper end portion 126b and a smaller circular-shaped lower end portion 126d joined by a tapered vertical portion 126c which decreases in width as it extends downwardly.

Flange 154a and vertical wall 158a of the adapter in FIGS. 25 to 33 are the same as 54a and 58a in FIGS. 20–24. However, instead of portions 58b, 58c and 58d extending at a right angle from the wall 158a as in FIGS. 20–24, such wall has extending integrally at a right angle from a portion of the bottom thereof spaced slightly inwardly from the outer end of such wall, a short, plastic shank 158b of circular cross sectional shape which has at its opposite end an enlarged disc-shaped member 158d disposed vertically and parallel to wall 158a but spaced slightly from such wall, the member 158d and shank 158b corresponding in shape to a button. The lower half of the periphery of shank 158b is below the lower surface of flange 154a and wall 158a. The outer vertical edge of wall 158a and the outer periphery of disc 158d, where it is intersected by the horizontal diameter of the disc, fall in about the same vertical plane and the center axes of rod 158b and disc 158d are coaxial. The horizontal diameter of the disc lies in about the same plane as the lower edge of hood 46. The length of shank 158b (the spacing between disc 158d and wall 158a) is about the same or slightly larger than the thickness of the double panel 20. The diameter of disc 158d is slightly smaller than the circular top portion 126b of slot 126a, the width of the narrow lower end of intermediate passage 126c is about the same or slightly larger than the diameter of shank 158b and the diameter of the lower circular portion 126d is only slightly larger than the diameter of the shank 158b.

Hood 46 has a vertical slot 146 therein extending substantially to the cylinder periphery 36, one vertical edge of the slot being aligned with and lying in substantially the same plane with the inner surface of wall 158a from which shank 158b extends and with the surface of vertical rib 48 of hood 46 (see FIG. 33) located adjacent wall 158a, which in turn lies substantially in the same plane with such wall surface. This surface of rib 48 is exposed by the slot 146 so that it forms a continuation of the surface of wall 158a as shown in FIG. 33. The lower end portion 148 of the edge of slot 146 opposite from the edge which is aligned with the surface of wall 158a is flared outwardly at 148, as shown. The width of the upper portion 147 of slot 146 is about the same as the double thickness of the panels 20. The horizontal distance between the end of slot 146 and the center axis of disc 158d is about the same as the horizontal distance between the edge 26 of the panels 120 and the center axes of holes 126b and 126d (i.e. the vertical center axis of the slot 126a). The lower end of slot 126a is at the same level as or slightly higher than or slightly lower than the top edge 16 of the plastic bag panels.

The adapter of FIGS. 25 to 33 is assembled to the bag as shown in FIGS. 25 to 27 by inserting the lower end of the cylinder 36 of the adapter into the opening in the bag (exposed by removing the portion of panel 20 to the left of line 26), as shown in FIG. 25, with the serrated edge portion 26 of the panels 20 fitting snugly in the slot 146 and against the end of the slot as shown in FIG. 25, and with the wall 158a extending along one side of the panels 20 and disc 158d aligned with hole 126b, as shown. The disc 158d is then moved through the hole 126b by turning the adapter about a vertical axis so that rod 158b is located in the hole and the wall 158a is moved flush against the panels 20, as shown in FIG. 26, followed by moving the adapter downwardly with respect to panels 20 to the position shown in FIG. 27 which causes the shank 158b to slide downwardly in slot 126a through the intermediate passage 126c into the hole 126d against the lower edge of the hole. In this position, the panel 20 is gripped snugly between the disc 158d and the wall 158a and between the opposed edges of slot 126a and the aforesaid surface of rib 48a to hold the adapter firmly on the panels 20.

The adapter can be easily removed by moving it up with respect to the bag panels to move shank 158b up into hole 126b after which the disc 158d can be moved through the hole 126b, thereby permitting the adapter to be lifted off from the bag assembly.

The bag and liner of the closure member may be made of any heat-sealable (thermoplastic), flexible material, preferably transparent in the case of the bag, so long as they are capable of flowing together by the application of heat or other condition to provide (1) a good seal between the closure-handle element and bag and between the bag panels and (2) a bond between the closure-handle element and the bag of sufficient strength so that it will support with an adequate safety factor the weight of a bag full of urine when the bag is supported by the closure-handle element. Also, the bag material must be inert to urine. However, polyethylene is a preferred material. The closure member may be made of any material which is relatively stiff compared to the bag, e.g. vinyl plastic, polystyrene, etc., and which can be torn easily along the score line. If the material of the closure-handle is fusible with the bag material, the liner can be eliminated. The closure-handle material should be stiff enough to firmly support the adapter and to provide a satisfactory handle for supporting the bag without buckling.

Although the hook construction shown in FIG. 19 is shown as being made of a flat strip of material such as stainless steel, extruded aluminum, etc., it may also be in the form of a wire frame defining substantially the same form. In such case, the wire frame would define the edge portions only of the hook construction shown in FIG. 19.

The relative terms "upper," "lower," "top," "bottom," "side," "right side," "left side," etc. have been used in the above description to describe the spacial relationship of the parts to each other and the invention is not intended to be limited thereby. For example, if the bag is turned upside down, what was the top becomes the bottom.

It is pointed out that the modifications described above and shown in the accompanying drawings are for illustrative purposes only. Various changes may be made in form, details, arrangement and proportions of the parts without departing from the scope of the invention which is limited only by the appended claims and the equivalents thereof.

I claim:

1. A disposable drainage bag comprising (1) a flat, flexible synthetic plastic bag having a pair of flat parallel side panels joined at the bottom and side edges thereof and (2) closure means for said bag comprising a pair of flat parallel closure panels of a material which is substantially stiffer than said flexible plastic bag and between which the upper edges of said bag panels and the portions of said bag panels adjacent said upper edges are sandwiched, said closure panels being sealed together and to the bag panels sandwiched therebetween along a portion of the width of said closure panels and bag panels but being unsealed to the bag panels along the remaining portion of their width, said portions of the widths of said bag panels sandwiched between said closure panels and sealed to said closure panels being also sealed to each other, said portions of said widths of said bag panels unsealed to the closure panels being unsealed to each other at least the portions of said closure panels, which are unsealed to said bag panels, extending upwardly beyond the unsealed upper edges of said bag panels, said upwardly extending portions of said closure panels being joined together to enclose said unsealed upper edges of said bag panels, means on said closure panels to facilitate tearing the portions of said closure panels unsealed to said bag panels from the portions sealed to said bag panels to thereby expose said upper edge portions of said panels which are unsealed with respect to each other.

2. A drainage bag according to claim 1, said closure panels having registered finger slots for holding said bag.

3. A disposable drainage bag comprising (1) a flat flexible plastic bag having a pair of flat parallel side panels joined at the bottom and side edges thereof and (2) closure means for said bag comprising a pair of flat parallel closure panels of a material which is substantially stiffer than said flexible plastic bag and between which the upper edges of said bag panels and the portions of said bag panels adjacent said upper edges are sandwiched, said closure panels being sealed together and to a portion of the bag panels sandwiched therebetween, a portion of said bag panels sandwiched between said closure panels being unsealed to the closure panels and to each other, means on said closure panels to facilitate tearing the portions of said closure panels unsealed to said panels from the portions sealed to said panels to thereby expose the portion of said panels which are unsealed with respect to each other, said closure panels having registered finger slots for holding said bag, said means to facilitate tearing comprising registered score lines in said closure panels.

4. A bag according to claim 1, said closure panels comprising strips of cardboard.

5. A bag according to claim 4, the inner surfaces of said cardboard strips having adhered thereto a liner of thermoplastic resin, said seal being provided by the fusion together of the liners of the closure panels and the plastic material of said bag panels sandwiched therebetween.

6. A bag according to claim 1, the portions of said closure panels which are sealed to each other having a slot for attaching an adapter to said bag, said slot having an enlarged portion extending into a smaller portion.

7. A disposable drainage bag comprising (1) a flat, flexible plastic bag having a pair of parallel flat side panels joined at the bottom and side edges thereof and (2) closure means for closing the upper edges of said bag comprising a pair of flat panels of a material which is substantially stiffer than said flexible platstic bag and between which said upper edges and the portions of said side panels of said bag adjacent said upper edges are sandwiched, said closure panels extending upwardly beyond said upper edges of said bag and sideways beyond at least one side edge of said bag, said closure panels having registered score lines located intermediate the side edges of the closure panels and of the side panels of the bag closer to said one side edge of said closure panels and side panels than the other, said closure panels being sealed together at their margins beyond the upper edges and said one side edge of said bag panels, said closure panels being also sealed to said bag panels sandwiched therebetween from said score lines to said other side edge of said bag, said sandwiched bag panels being unsealed to the closure panels and to each other from said score lines to said one side edge of said bag, whereby the top of said bag is sealed by said closure panels and whereby when the closure panels are severed at said score lines the portions of said closure panels which are located between said score lines and said one side edge thereof and which are sealed together but not to said side panels of said bag can be removed from said bag to expose the unsealed upper edges of said bag between said score lines and said one side edge of said bag to provide an opening in said bag.

8. A bag according to claim 7, said portion of said closure panels between said score lines and said other side edges thereof and above said upper edges of said bag panels, having registered slots adjacent said score line for attaching an adapter thereto, said slots being enlarged at one end and extending from said enlarged end to a smaller end.

9. A bag according to claim 8, said slots being vertically disposed and having the general shape of a key-hole, the enlarged portion being circular in shape and disposed at the upper end, said enlarged portion extending downwardly into a narrower portion.

10. A bag according to claim 7, said closure means comprising a sheet of material folded downwardly over said upper edges of said bag panels and along said sandwiched portions of said bag panels.

11. A bag according to claim 7, the portions of said closure panels between said score lines and said other side edges thereof having registered horizontal finger slots to form a handle for holding the bag.

12. A bag according to claim 11, said slots being located above said upper edges of said bag.

13. A bag according to claim 7, said bag comprising a thermoplastic resin, the inner surfaces of said closure panels having a thermoplastic liner adhered thereto, said seal between said closure panels being provided by fusion together of the liners of the closure panels, said seal between said closure panels and bag panels being provided by fusion together of said liners and the bag panels sandwiched therebetween.

14. In combination, an adapter and a tube for a drainage collecting container, said adapter comprising a hollow member having a top end wall with an opening, said tube having an end portion which is secured in and extends through said opening into the interior of said hollow member, the periphery of said end portion of said tube within the hollow member being spaced radially inwardly from the inner wall of said hollow member, the end of said tube located within said hollow member being spaced a substantial distance above the lower end of said hollow member, the lower portion of said hollow member being adapted to be received within an opening in a drainage collecting container, said hollow member having means for limiting the distance which said hollow member can be inserted into said container opening and means for providing for overflow of liquid from said container to prevent liquid from rising in said hollow member to the said end of said tube.

15. In combination, an adapter and a tube for a drainage collecting container, said adapter comprising a tubular member having a top end wall with an opening, said tube having an end portion which is secured in and extends through said opening into the interior of said tubular member, the periphery of said end portion of said tube within said tubular member being spaced radially inwardly from the inner wall of said tubular member, the end of said tube located within said tubular member being spaced above the lower end of said tubular member, said tubular member having a protecting flange extending outwardly from the periphery thereof intermediate its ends and below said end of said tube, the lower portion of said tubular member below said flange being adapted to be placed within an opening in a drainage collecting container, said flange and the portion of said tubular member below said flange forming means providing for overflow of liquid from said container to prevent the liquid from rising in said tubular member to the said end of said tube located in said tubular member.

16. In combination, an adapter and a tube for a drainage bag, said adapter comprising a tubular member having a top end wall with an opening smaller in cross sectional dimension than said tubular member and, said tube having an end portion which is secured in and extends through said opening into the interior of said tubular member, the periphery of said end of said tube within said tubular member being spaced radially inwardly from the inner wall of said tubular member, the end of said tube located within said tubular member being spaced above the lower end of said tubular member, said tubular member having a protecting flange extending outwardly from and around the periphery thereof intermediate its ends and below said end of said tube, the lower portion of said tubular member below said flange being adapted to be placed within an opening in a drainage bag, said flange and the portion of said tubular member below said flange forming means providing for overflow of liquid from said bag to prevent the liquid from rising in said tubular member to the said end of said tube located in said tubular member, said overflow means comprising a vertical channel in the tubular member below said flange, the upper portion of said channel being defined in part and covered by a portion of said flange, the portion of said channel defined in part by said flange extending radially outwardly further than the lower portion of said channel.

17. In combination, an adapter and a tube for a drainage bag, said adapter comprising a tubular member having a top end wall with an opening, said tube having an end portion secured in and extending through said opening into said tubular member and being of smaller dimension than said tubular member whereby the periphery of the end portion of said tube located in said tubular member is spaced radially inwardly from the inner wall of said tubular member, the end of said tube located within said tubular member being spaced above the lower end of said tubular member, said tubular member having an outwardly and downwardly extending flange intermediate the ends thereof, said flange having a plurality of vertical ribs extending between and integral with the flange and the periphery of the tubular member located within said flange to divide the space between said flange and periphery into a plurality of overflow chambers the lower edges of said ribs being at substantially the same level as the lower edge of said flange, the inner portions of said ribs extending downwardly into a plurality of vertical fins extending radially from said tubular member and located below the flange, said fins forming channels which together with said chambers form overflow channels, said flange and overflow channels being located below the end of said tube located within said tubular member.

18. An adapter for a drainage bag, said adapter comprising a tubular member having a top end wall with an opening in which is received an end portion of a drainage tube, said end portion of said tube extending through said opening into said tubular member and being of smaller dimension than said tubular member whereby the periphery of the end portion of said tube located in said tubular member is spaced radially inwardly from the inner wall of said tubular member, the end of said tube located within said tubular member being spaced above the lower end of said tubular member, said tubular member having an outwardly and downwardly extending flange intermediate the ends thereof, said flange having a plurality of vertical ribs extending between and integral with the flange and the periphery of the tubular member located within said flange to divide the space between said flange and periphery into a plurality of overflow chambers the lower edges of said ribs being at substantially the same level as the lower edge of said flange, the inner portions of said ribs extending downwardly into a plurality of vertical fins extending radially from said tubular member and located below the flange, said fins forming channels which together with said chambers form overflow channels, said flange and overflow channels being located below the end of said tube located within said tubular member, the lower edge of said outwardly and downwardly extending flange extending radially outwardly into a horizontal flange extension, the lower surface of said flange extension lying in the same plane as the lower edges of said ribs and said flange, said flange extension having at its end means for attaching said adapter to a drainage bag.

19. An adapter according to claim 18, said horizontal flange extension having a vertical wall extending therealong, means for attaching said adapter to a drainage bag comprising an end portion of said horizontal extension extending at an angle therefrom away from said vertical wall and of reduced height compared to said vertical wall, said last mentioned portion having integrally at its end a vertically disposed member of greater height than said portion of reduced height.

20. An adapter according to claim 18, the lower parts of said fins tapering inwardly to the periphery of said tubular member.

21. An assembly of a drainage collecting container having an opening and adapter received in said opening, said adapter comprising a hollow member having a top end wall with an opening, and a tube having an end portion which extends through said opening into the interior of said hollow member, the periphery of said end of said tube within said hollow member being spaced radially inwardly from the inner wall of said hollow member, the end of said tube located within said hollow member being spaced a substantial distance above the lower end of said hollow member, the lower portion of said hollow member being received within said container opening, said hollow member and container assembly having means to limit the distance to which said hollow member can be inserted into said container opening, said assembly of said hollow member and container having means below the end of said tube to provide for overflow of liquid from said container to prevent the liquid from rising in said hollow member to said end of said tube located in said hollow member, said adapter and container having cooperating means mounting said adapter on said bag with said lower portion of said hollow member located within said container opening.

22. An assembly of a disposable drainage bag, an adapter and a drainage tube, said drainage bag comprising (1) a flat, flexible plastic bag having a pair of parallel flat side panels joined at the bottom and side edges thereof and (2) closure means for partially closing the upper edges of said bag comprising a pair of flat panels of a material which is stiffer than said flexible plastic bag and between which a portion of said upper edges is sandwiched, said closure panels extending upwardly beyond said upper edges of said bag, said closure panels extending from a point intermediate the side edges of said bag to and beyond one side edg thereof, with the remaining portion of said upper edges from said point to the other side edge of said bag being exposed, said closure panels being sealed together at their margins beyond the upper edges and said side edge of said bag, said closure panels being also sealed to said bag panels sandwiched therebetween, said exposed upper edge portions of said bag being unsealed to thereby provide an exposed opening in said bag, said adapter being removably located in said exposed opening in said drainage bag to direct flow of liquid from said drainage tube through said adapter into said bag, said adapter comprising a tubular member having a top end wall with an opening in which is received an end portion of said tube, said end portion of said tube extending into said tubular member, said tube being smaller in cross sectional dimension than said tubular member whereby the periphery of said end portion of said tube received within said tubular member is spaced radially inwardly from the inner wall of said tubular member, the end of said tube located within said tubular member being spaced above the lower end of said tubular member, the lower portion of said tubular member being received within said exposed opening in said bag, said tubular member having a flange located intermediate the ends thereof below said end of said tube, said flange extending radially outwardly over the exposed upper edge of said bag forming said opening to limit the extent to which the adapter can be inserted into said opening when said adapter is inserted into said opening and to cover said opening, said flange and the periphery of said tubular member located below said flange and within said opening being provided with an overflow vertical channel extending above and below said upper edge of said opening to thereby provide for overflow of liquid from said drainage bag and prevent the liquid from rising in said tubular member to said end of said tube, the portion of said channel above said upper edge of said opening and formed by said flange extending radially outwardly further than the portion of the channel below said upper edge of said opening and beyond said upper edge, said flange covering said portion of said channel located above said upper edge, said channel providing a passage for the flow of liquid upwardly through the portion of said channel located within the opening and below the upper edge of the opening and then radially outwardly beyond such upper edge through said portion of said channel formed by said flange and extending radially outwardly beyond said upper edge and then downwardly to the atmosphere and means for removably attaching said adapter to said bag in said opening, as aforesaid.

23. The combination according to claim 22, said flange having a horizontal extension, said extension and the portion of the closure panels remaining sealed to said bag after the portions of said closure panels unsealed to said bag have been removed having cooperating means for firmly securing said adapter to said remaining portion of said closure panels with said adapter located adjacent the severed scored edge of said remaining portions and in said exposed opening of said bag.

24. The combination according to claim 23, said cooperating means for securing said adapter to said closure panels comprising a slot in said remaining portion of said closure panels adjacent the severed edge thereof, said flange extension having a portion which is adapted to be moved into said slot to secure the adapter to said remaining portion.

25. The combination according to claim 24, said slot having an enlarged end portion and a narrower end portion, said horizontal flange extension extending from said flange along a side of said remaining portion of said closure panels and having a vertical wall extending upwardly from the edge thereof adjacent said remaining portion, said vertical wall at its end having a member of reduced height extending toward said remaining portion of said closure panels, said reduced member having at its end a vertically disposed member of greater height than said reduced member, said vertically disposed member being slightly less in size than the enlarged end portion of said slot but larger in size than said narrow end portion, the dimension of said reduced height member between said vertical wall and said vertically disposed portion being slightly greater than the thickness of said closure panels, whereby said adapter is attached to said remaining portion of said closure panels by holding said adapter in a position in which said vertically disposed member is registered with said enlarged end of said slot followed by inserting said vertically disposed member sideways through said enlarged end with said reduced member located in said slot followed by moving said reduced member laterally in the slot into said smaller end portion with said vertically disposed member at one side of the slot extending beyond said slot and the vertical wall of greater height on the other side of said slot extending beyond said slot to thereby confine the thickness of said closure panels therebetween, whereby the adapter is secured to said remaining portion of said closure panels.

26. A combination according to claim 23, said flange extending outwardly and downwardly from the periphery of said tubular member and having a plurality of vertical ribs extending between said flange and the periphery of said tubular member to divide the interior of said flange into a plurality of chambers, the lower horizontal edges of said ribs being in the same plane as the lower edge of said flange and being adapted to engage the upper edge of said bag forming said opening with said flange extending radially outwardly beyond said upper edge, said flange extension extending outwardly and horizontally from the lower edge of said downwardly and outwardly extending flange toward and beyond said severed scored edge, the lower surface of said extension lying in the same plane as the lower edges of said ribs and flange, the radially inner parts of said ribs extending downwardly into vertical fins which extend radially outwardly from the periphery of the tubular member below said ribs, the lower parts of said fins being tapered inwardly into said periphery to facilitate entry of the tubular member into said opening in said bag, the spaces between said fins and said ribs forming said overflow channels, the lower portions of said channels being formed by the fins and wall of the opening and being located below the upper edge of the opening, the upper portions of said channels being formed by said ribs and flange, being located above the edge of and outside the opening and extending radially outwardly beyond the edge of the opening to permit discharge of overflow liquid, said flange covering said upper portions of said channels.

27. A combination according to claim 26, said flange extension having a vertical wall extending upwardly therefrom and radially inwardly along said remaining portion of said closure panels to the flange.

28. In combination a disposable drainage bag and adapter therefor, said bag comprising a flat, flexible plastic bag having a pair of parallel flat side panels joined at the bottom and side edges thereof and closure means for closing a part of the upper edges of said bag comprising a pair of flat panels of a material which is substantially stiffer than said flexible bag and between which said upper edges and the portions of said side panels of said bag adjacent said upper edges are sandwiched, said closure panels extending upwardly beyond said upper edges of said bag, said closure panels being sealed together and to the bag panels sandwiched therebetween, said closure panels being less in width than said bag and extending from one side edge of said bag toward the other side but terminating in side edges before reaching said other side thereby leaving an opening in said bag formed by the upper edges of said bag panels beyond said closure panels, said side edges of said closure panels extending upwardly above said opening, said adapter comprising a tubular member having a top end wall with an opening in which is received an end portion of a drainage tube, said end portion of said tube extending into said tubular member, said tube being smaller in cross sectional dimension than said tubular member whereby the periphery of said end portion of said tube received within said tubular member is spaced radially inwardly from the inner wall of said tubular member, the lower portion of said tubular member being removably received within said opening in said bag with the upper portion of the adapter positioned outside said bag and alongside said side edges of said closure panels, said tubular member having a flange located intermediate the ends thereof below said end of said tube, said flange extending radially outwardly over the exposed upper edge of said bag forming said opening to limit the extent to which the adapter can be inserted into said opening and to cover said opening, said flange and the periphery of said tubular member located below said flange and within said opening being provided with an overflow vertical channel extending above and below said upper edge of said opening to thereby provide for overflow of liquid from said drainage bag and prevent the liquid from rising in said tubular member to said end of said tube, the portion of said channel above said upper edge of said opening and formed by said flange extending radially outwardly further than the portion of the channel below said upper edge of said opening and beyond said upper edge, said flange covering said portion of said channel located above said upper edge, said channel providing a passage for the flow of liquid upwardly through the portion of said channel located within the opening and below the upper edge of the opening and then radially outwardly beyond such upper edge through said portion of said channel formed by said flange and extending radially outwardly beyond said upper edge and then downwardly to the atmosphere, said adapter and closure panels having cooperating means for removably mounting said adapter in said position on said bag.

References Cited by the Examiner

UNITED STATES PATENTS

| | | | |
|---|---|---|---|
| 551,973 | 12/1895 | Knap | 128—241 |
| 1,487,824 | 3/1924 | Vincent | 141—297 |
| 2,058,118 | 10/1936 | White | 141—392 |
| 2,111,031 | 3/1938 | Newton | 141—285 |
| 2,620,944 | 12/1952 | Stahl. | |
| 2,701,680 | 2/1955 | Weisheimer | 229—62 |
| 2,856,932 | 10/1958 | Griffitts | 128—294 |
| 2,900,979 | 8/1959 | Bishop | 128—283 |
| 2,959,386 | 11/1960 | Garth | 248—95 |
| 3,014,638 | 12/1961 | Farley | 229—62 |
| 3,090,968 | 5/1963 | Buono | 128—275 |

FOREIGN PATENTS 1,129,010  9/1956  France.

RICHARD A. GAUDET, *Primary Examiner.*

C. F. ROSENBAUM, *Assistant Examiner.*